United States Patent
Tsuchida et al.

(10) Patent No.: US 9,389,447 B2
(45) Date of Patent: Jul. 12, 2016

(54) PANEL COMPOSITE BODY, DISPLAY DEVICE AND PANEL COMPOSITE BODY MANUFACTURING METHOD

(75) Inventors: Kenichiroh Tsuchida, Osaka (JP); Nobuhiro Nakata, Osaka (JP); Masataka Ohyama, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 196 days.

(21) Appl. No.: 14/114,981

(22) PCT Filed: May 2, 2012

(86) PCT No.: PCT/JP2012/061587
§ 371 (c)(1),
(2), (4) Date: Oct. 31, 2013

(87) PCT Pub. No.: WO2012/153687
PCT Pub. Date: Nov. 15, 2012

(65) Prior Publication Data
US 2014/0078444 A1 Mar. 20, 2014

(30) Foreign Application Priority Data
May 9, 2011 (JP) .................................. 2011-104221

(51) Int. Cl.
*G02F 1/1335* (2006.01)
*G02F 1/1333* (2006.01)
*G02F 1/1347* (2006.01)

(52) U.S. Cl.
CPC ...... *G02F 1/133308* (2013.01); *G02F 1/13471* (2013.01); *G02F 1/13528* (2013.01); *G02F 1/13338* (2013.01); *G02F 2201/503* (2013.01); *G02F 2202/28* (2013.01)

(58) Field of Classification Search
CPC .......... G02F 1/133528; G02F 1/13471; G02F 1/133308; G02B 6/005; G02B 6/0093
USPC ........................................................... 349/12
See application file for complete search history.

(56) References Cited

U.S. PATENT DOCUMENTS

| 7,903,182 B2 * | 3/2011 | Ishii et al. ....................... 349/12 |
| 7,952,862 B2 * | 5/2011 | Sakai ....................... 361/679.21 |
| 2009/0066862 A1 * | 3/2009 | Ishii .................. G02F 1/133308 349/12 |
| 2009/0185100 A1 * | 7/2009 | Matsuhira .............. G02B 6/005 349/58 |
| 2009/0231508 A1 * | 9/2009 | Sato et al. ....................... 349/58 |
| 2010/0060601 A1 * | 3/2010 | Oohira .......................... 345/173 |

FOREIGN PATENT DOCUMENTS

| JP | 2005-181410 A | 7/2005 |
| JP | 2006-11212 A | 1/2006 |
| JP | 2009-122655 A | 6/2009 |

* cited by examiner

*Primary Examiner* — Hoan C Nguyen
(74) *Attorney, Agent, or Firm* — Chen Yoshimura LLP

(57) ABSTRACT

This panel composite body 1 according to the present invention is provided with: a main panel 11 that has a large first substrate 111 and a small second substrate 112, the edge portion 111a of the large substrate 111 protruding further outwards than the edge portion 112a of the small substrate 112, and that has a polarizing plate 115 arranged on the outer surface 112c side of the second substrate so as to fit on the plate surface of the second substrate 112; a plate member 12 that, protruding further outwards than the edge portion 112a of the second substrate 112, sandwiches the polarizing plate 115 together with the second substrate 112; and an adhesive layer 21 that, bonding the main panel 11 and the plate member 12, is disposed between the polarizing plate 115 and the plate member 12 and, so as to cover the edge portion of the polarizing plate 115, between the second substrate 112 and the plate member 12.

9 Claims, 8 Drawing Sheets

PANEL COMPOSITE BODY, DISPLAY DEVICE AND PANEL COMPOSITE BODY MANUFACTURING METHOD

TECHNICAL FIELD

The present invention relates to a panel composite body, a display device, and a manufacturing method for a panel composite body.

BACKGROUND ART

In recent years, display devices including function panels such as touch panels, viewing angle control panels, and parallax barrier panels, along with liquid crystal panels that display images and the like are known (refer to Patent Document 1, for example). In these types of display devices, the above-mentioned function panel as an auxiliary panel is bonded to a surface of the liquid crystal panel as a main panel through an adhesive.

As the adhesive, in general, a photocurable (photosensitive) adhesive is used. Such a photocurable adhesive is liquid before being cured by being irradiated with light such as ultraviolet, and has fluidity. When bonding together the main panel and the auxiliary panel, this fluid adhesive is first applied to a surface of the main panel. The auxiliary panel is stacked onto the surface of the main panel so as to sandwich the adhesive applied in this manner. Then, respective positions of the main panel and the auxiliary panel are set and the adhesive is irradiated with light such as ultraviolet light, thus bonding together the main panel and the auxiliary panel.

If the adhesive layer between the main panel and the auxiliary panel has an uneven thickness, then variation occurs in the distance (gap) between the main panel and the auxiliary panel. This sometimes causes display unevenness such as color unevenness in the image in the main panel perceived by a user through the auxiliary panel. Thus, in order to provide the adhesive layer with an even thickness, while the adhesive is still fluid, the adhesive is thinly spread between the main panel and the auxiliary panel so as to be flat.

In general, a polarizing plate is provided on the topmost surface of the main panel (liquid crystal panel). Thus, specifically, the adhesive is thinly spread as described above between the polarizing plate and the auxiliary panel. Generally, the polarizing plate is somewhat smaller than the main body of the main panel (liquid crystal panel), and the periphery of the polarizing plate is to the inside of the periphery of the main panel.

Some of the adhesive seeps towards the outside from between the polarizing plate and the auxiliary panel. Among the adhesive that seeps out, some of the adhesive reaches the surface of the main body of the main panel further out than the periphery of the polarizing plate, causing it to cover the periphery of the polarizing plate.

The polarizing plate is easily affected by humidity, and swells if it absorbs water (moisture) from the outside air, and thus, the polarizing plate sometimes undergoes a change in thickness. Swelling in the polarizing plate is sometimes a cause for the display unevenness described above. Thus, the periphery of the polarizing plate is covered by the adhesive.

RELATED ART DOCUMENT

Patent Document

Patent Document 1: Japanese Patent Application Laid-Open Publication No. 2005-181410

Problems to be Solved by the Invention

If liquid adhesive seeps out from between the main panel and the auxiliary panel as described above, then there is a problem that depending on how much seeps out, sometimes the adhesive reaches the display surface of the auxiliary panel or the rear surface of the main panel. If the adhesive sticks to the display surface of the auxiliary panel and the like, this contaminates those portions resulting in display anomalies.

SUMMARY OF THE INVENTION

An object of the present invention is to provide, for a panel composite body including a main panel and an object to be bonded thereto, a technique to minimize seepage of an adhesive disposed therebetween towards the outside from an edge portion of the panel composite body.

Means for Solving the Problems

A panel composite body according to the present invention includes: a main panel having: a first substrate and a second substrate that is smaller than the first substrate, the first substrate and the second substrate forming a pair of substrates bonded together such that respective inner surfaces thereof face each other, an edge portion of the first substrate protruding further out than an edge portion of the second substrate; and a polarizing plate disposed on an outer surface of the second substrate so as to fit within the outer surface of the second substrate in a plan view; an auxiliary panel sandwiching the polarizing plate with the second substrate, the auxiliary panel having a plate member protruding further out than the edge portion of the second substrate; and an adhesive layer bonding together the main panel and the auxiliary panel, the adhesive layer being disposed between the polarizing plate and the auxiliary panel and between the second substrate and the auxiliary panel so as to cover a periphery of the polarizing plate.

The panel composite body may be configured such that the auxiliary panel further includes an opposite plate member bonded to the plate member so as to face the plate member, the opposite plate member being disposed between the plate member and the polarizing plate.

In the panel composite body, the auxiliary panel may have a third substrate as the opposite plate member and a fourth substrate that is larger than the third substrate as the plate member forming a pair of substrates bonded together such that respective inner surfaces thereof face each other, in which an edge portion of the fourth substrate protrudes further out than an edge portion of the third substrate, the edge portion of the fourth substrate protruding further out than at least the edge portion of the second substrate, an inner surface at the edge portion of the fourth substrate facing an inner surface at the edge portion of the first substrate, the polarizing plate being sandwiched between the third substrate and the second substrate, and the adhesive layer may bond together the main panel and the auxiliary panel, the adhesive layer being disposed between the polarizing plate and the third substrate and between the second substrate and the third substrate so as to cover a periphery of the polarizing plate.

Another panel composite body according to the present invention includes: a main panel having a pair of a first substrate and a second substrate bonded together such that respective inner surfaces thereof face each other, and a polarizing plate disposed on an outer surface of the second substrate so as to fit within the outer surface of the second substrate in a plan view; an auxiliary panel having a third substrate and a fourth substrate that is larger than the third substrate, the third substrate and the fourth substrate forming a pair of substrates bonded together such that respective inner surfaces thereof face each other, in which an edge portion of the fourth substrate protrudes further out than an edge portion of the third substrate, in which an inner surface at the edge portion of the fourth substrate faces the outer surface at an edge portion of the second substrate, and in which the polarizing plate is sandwiched between the third substrate and the second substrate; and an adhesive layer bonding together the main panel and the auxiliary panel, the adhesive layer being disposed between the polarizing plate and the third substrate and between the second substrate and the third substrate so as to cover a periphery of the polarizing plate.

In the panel composite body, it is preferable that the adhesive layer be made of a photocurable adhesive.

A display device of the present invention includes the aforementioned panel composite body and an illumination device that radiates light to the panel composite body.

A manufacturing method for a panel composite body according to the present invention includes: applying an uncured fluid photocurable adhesive on an outer surface of a polarizing plate of a main panel having: a first substrate and a second substrate that is smaller than the first substrate, the first substrate and the second substrate forming a pair of substrates bonded together such that respective inner surfaces thereof face each other, an edge portion of the first substrate protruding further out than an edge portion of the second substrate; and the polarizing plate disposed on an outer surface of the second substrate so as to fit within the outer surface of the second substrate in a plan view; stacking an auxiliary panel including a plate member on the outer surface of the polarizing plate to which the adhesive has been applied such that the auxiliary panel protrudes further out than the edge portion of the second substrate so as to sandwich the polarizing plate between the auxiliary panel and the second substrate, and such that the adhesive is pressed and spread between the auxiliary panel and the polarizing plate; and curing the adhesive by radiating light thereon and thereby bonding together the main panel and the auxiliary panel.

The manufacturing method for a panel composite body may further include the auxiliary panel further including an opposite plate member bonded to the plate member so as to face the plate member, the opposite plate member being disposed between the plate member and the polarizing plate.

In the manufacturing method for a panel composite body, the auxiliary panel may have a third substrate as the opposite plate member and a fourth substrate that is larger than the third substrate as the plate member, the third substrate and the fourth substrate forming a pair substrates bonded together such that respective inner surfaces thereof face each other, an edge portion of the fourth substrate protruding further out than an edge portion of the third substrate, and the auxiliary panel is stacked onto the outer surface of the polarizing plate to which the adhesive is applied and the adhesive is pressed and spread between the auxiliary panel and the polarizing plate such that an edge portion of the fourth substrate protrudes further out than at least an edge portion of the second substrate, and an inner surface at the edge portion of the fourth substrate and an inner surface at the edge portion of the first substrate face each other with the polarizing plate being sandwiched between the third substrate and the second substrate.

Another manufacturing method for a panel composite body according to the present invention includes: applying an uncured fluid photocurable adhesive on an outer surface of a polarizing plate of a main panel that has a pair of a first substrate and a second substrate bonded together such that respective inner surfaces thereof face each other, and the polarizing plate disposed on an outer surface of the second substrate so as to fit within the outer surface of the second substrate in a plan view; stacking an auxiliary panel onto the outer surface of the polarizing plate to which the adhesive is applied, in which the auxiliary panel has a third substrate and a fourth substrate that is larger than the third substrate, the third substrate and the fourth substrate forming a pair of substrates bonded together such that respective inner surfaces thereof face each other, an edge portion of the fourth substrate protruding further out than an edge portion of the third substrate, an inner surface at the edge portion of the fourth substrate facing the outer surface at an edge portion of the second substrate, the polarizing plate being sandwiched between the third substrate and the second substrate, the adhesive being pressed and spread between the auxiliary panel and the polarizing plate; and curing the adhesive by radiating light thereon and thereby bonding together the main panel and the auxiliary panel.

Effects of the Invention

According to the present invention, for a panel composite body including a main panel and an object to be bonded thereto, a technique to minimize seepage of an adhesive disposed therebetween towards the outside from an edge portion of the panel composite body can be provided.

DETAILED DESCRIPTION OF EMBODIMENTS

Embodiment 1

Figure 1:
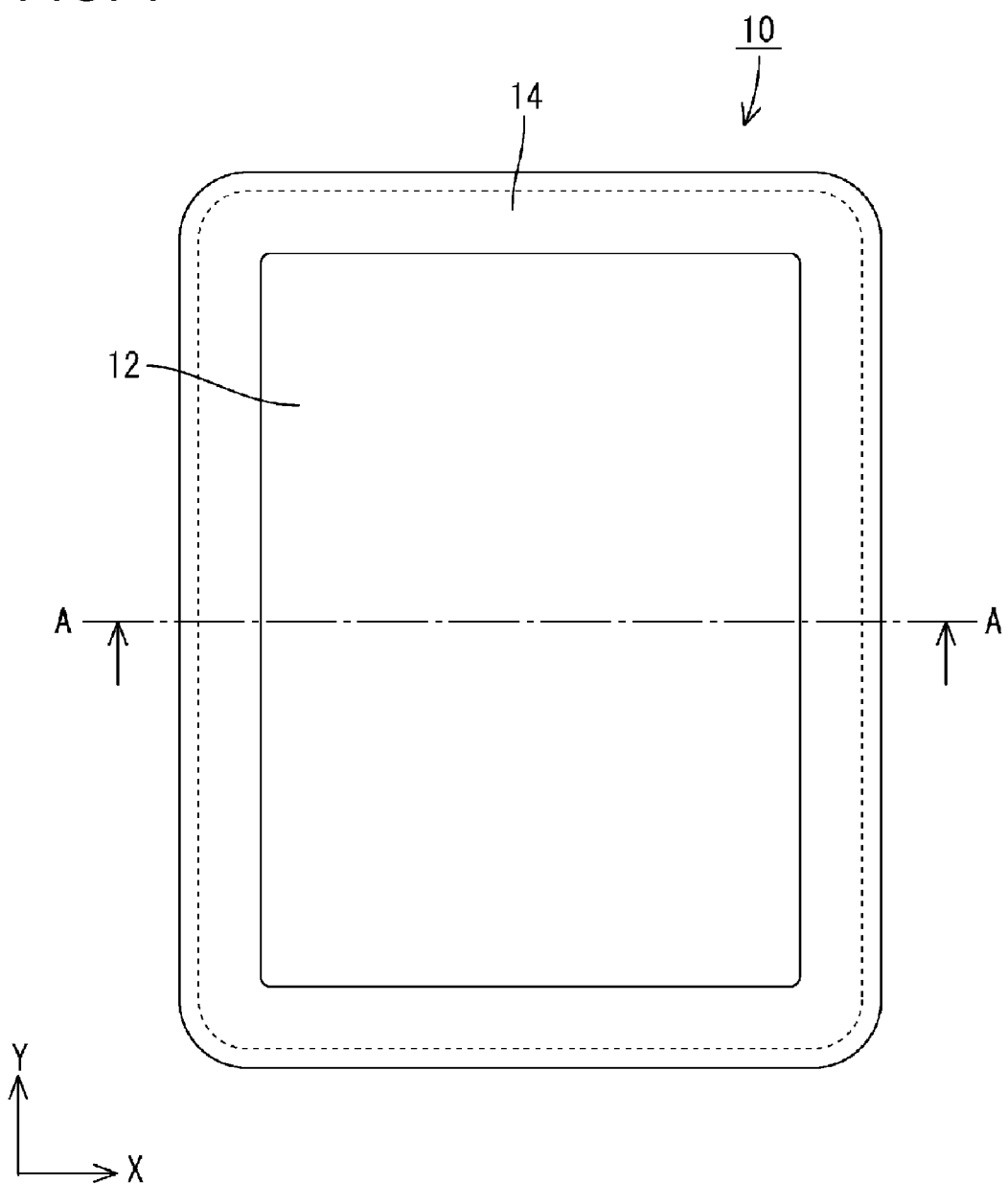
FIG. 1 is a plan view of a liquid crystal display device of Embodiment 1.
Figure 2:
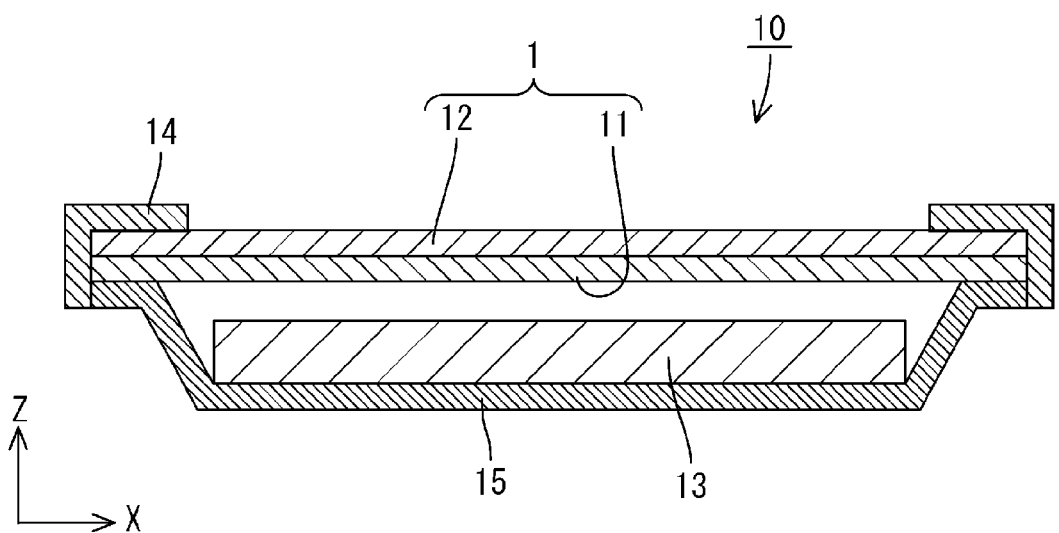
FIG. 2 is a cross-sectional view of the liquid crystal display device shown in FIG. 1.

Embodiment 1 of the present invention will be explained below with reference to FIGS. 1 to 4. In the present embodiment, a liquid crystal display device (display device) 10 will be described as an example. FIG. 1 is a plan view of the liquid crystal display device 10 in Embodiment 1, and FIG. 2 is a cross-sectional view of the liquid crystal display device 10 shown in FIG. 1. In the respective drawings, an X axis, a Y axis, and a Z axis are shown as necessary.

(Liquid Crystal Display Device)

As shown in FIG. 1, the liquid crystal display device 10 has a rectangular shape. FIG. 1 shows the liquid crystal display device 10 as viewed from the display surface side. FIG. 2 schematically shows the cross-sectional structure of the liquid crystal display device 10 along the widthwise direction (the line A-A shown in FIG. 1). The liquid crystal display device 10 of the present embodiment, as shown in FIG. 2, includes a panel composite body 1, an illumination device 13, a bezel 14, and a housing member 15.

The panel composite body 1 includes a liquid crystal panel (main panel) 11 that displays an image on a display surface on the front thereof, and a parallax barrier panel (auxiliary panel) 12 disposed on the front of the liquid crystal panel 11 to allow a user to perceive an image displayed on the display surface of the liquid crystal panel 11 as a stereoscopic image (three-dimensional image). The liquid crystal panel 11 and the parallax barrier panel 12 are substantially rectangular when viewed from the front (display surface side), and are set at substantially the same size. However, as will be described below, the liquid crystal panel 11 is set to be slightly larger than the parallax barrier panel 12. Also, the liquid crystal panel 11 and the parallax barrier panel 12 are bonded to each other through an adhesive layer.

The illumination device 13 is disposed on the rear side of the panel composite body 1. The illumination device 13 is housed in the box-shaped housing member 15, and the panel composite body is placed on the periphery of the housing member 15. The illumination device 13 is configured so as to radiate light towards the rear surface of the panel composite body 1. The frame-shaped bezel 14 covers the periphery of the panel composite body 1 (refer to FIG. 1).

Figure 3:
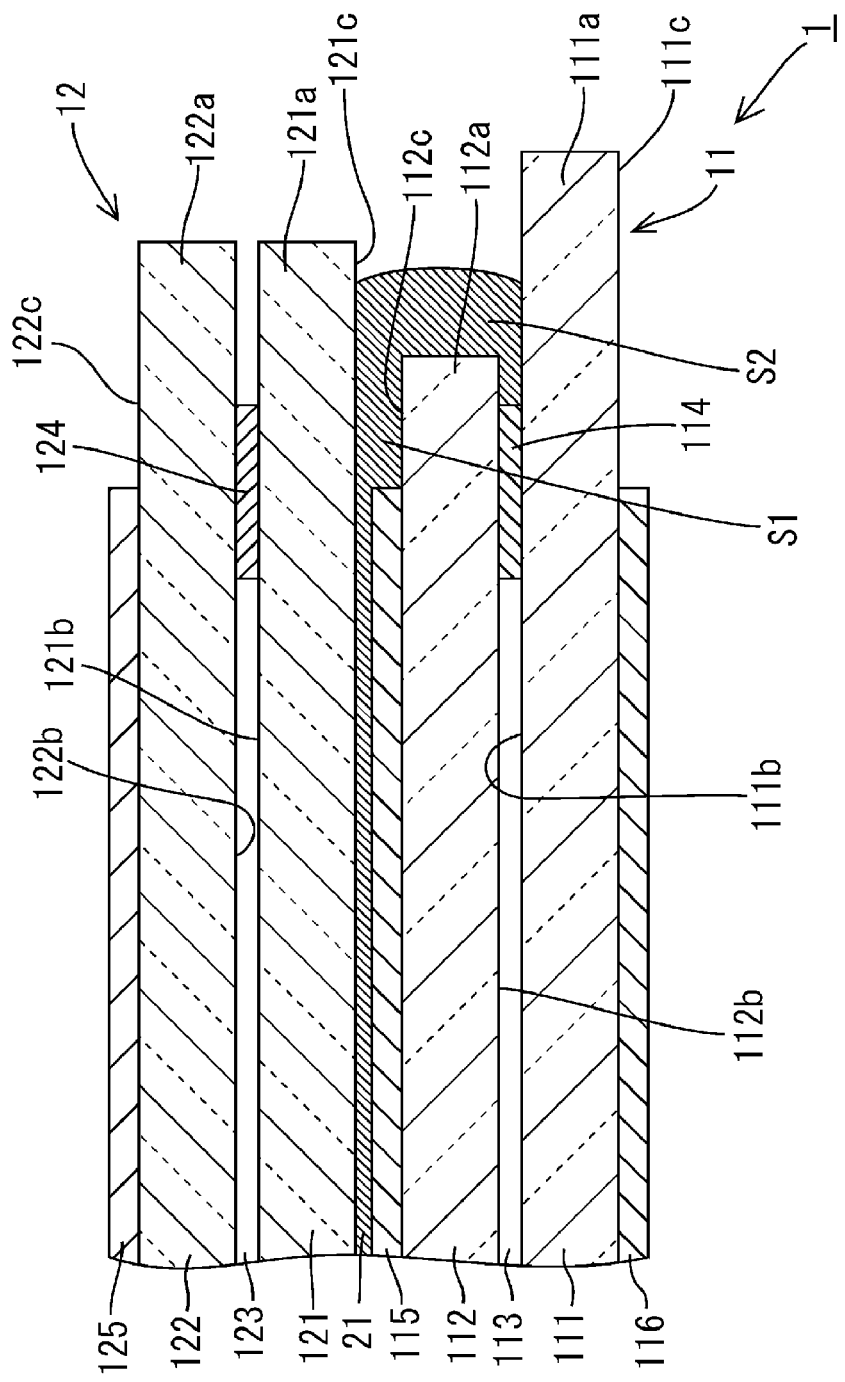
FIG. 3 is a magnified cross-sectional view of an edge portion of a panel composite body.
Figure 4:
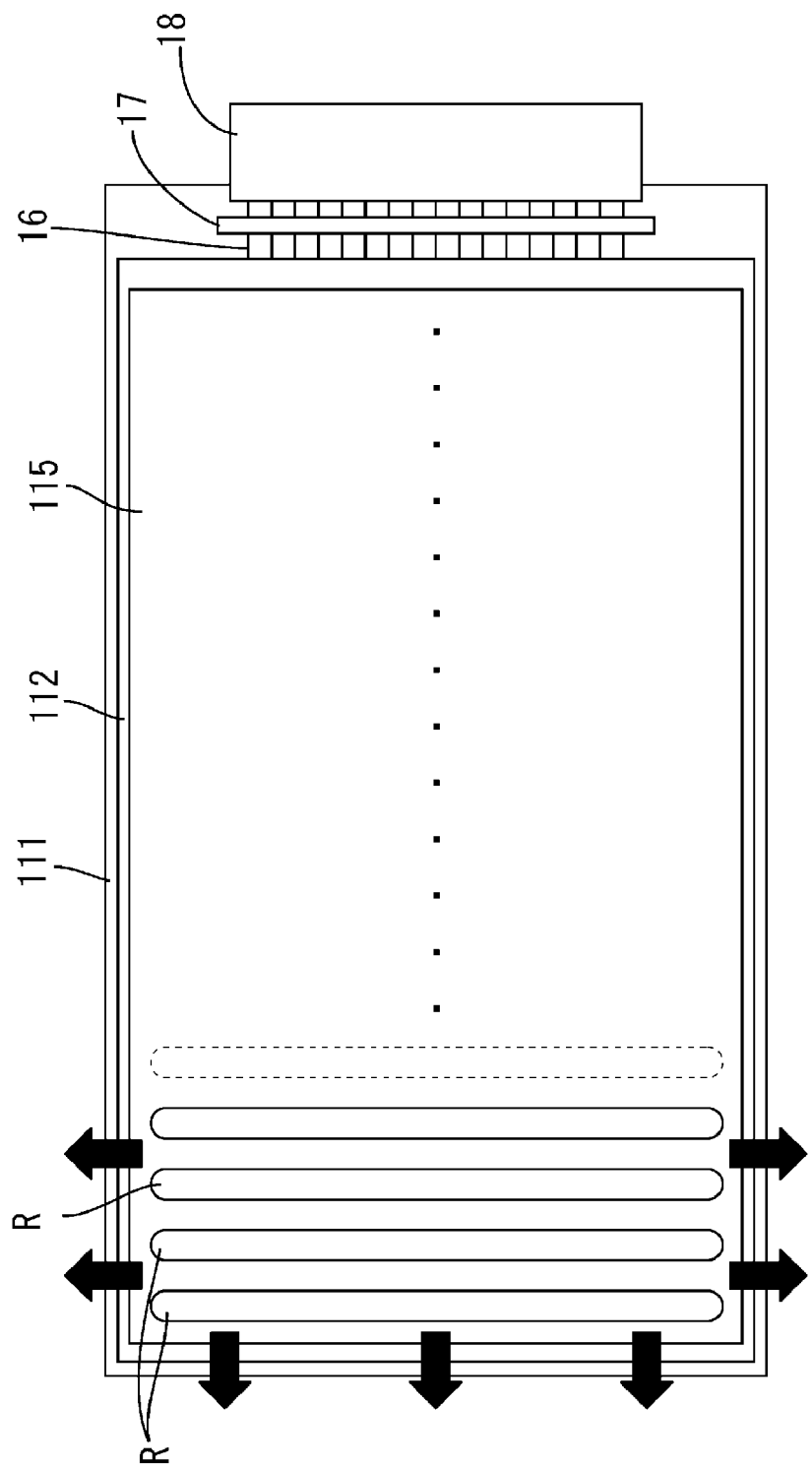
FIG. 4 is a plan view of a liquid crystal panel.

With reference to FIGS. 3 and 4, the panel composite body 1 and the respective panels 11 and 12 constituting the panel composite body 1 will be described in detail. FIG. 3 is a magnified cross-sectional view of an edge portion of the panel composite body 1, and FIG. 4 is a plan view of the liquid crystal panel 11. In FIG. 3, the parallax barrier panel 12 is shown towards the top, and the liquid crystal panel 11 is shown towards the bottom.

The liquid crystal panel 11 mainly includes a liquid crystal layer 113, a frame-shaped sealing member 114 that surrounds the liquid crystal layer 113, and a pair of transparent substrates 111 and 112, which sandwich the liquid crystal layer 113 and the sealing member 114 and have inner surfaces 111$b$ and 112$b$ that face each other. One of the substrates 111 is a thin film transistor (hereinafter, TFT) array substrate (first substrate) and the other substrate 112 is a color filter (hereinafter, CF) substrate (second substrate).

While the substrate 111 and the substrate 112 both have rectangular shapes, the substrate 111 is slightly larger than the substrate 112 (refer to FIG. 4). In other words, of the pair of substrates 111 and 112, the substrate 111 is larger and the substrate 112 is smaller. Also, as shown in FIG. 3 and the like, the substrates 111 and 112 are bonded to each other such that an edge portion 111$a$ of the substrate 111 protrudes further out than an edge portion 112$a$ of the substrate 112. In other words, the edge portion of the liquid crystal panel 11 is formed in a step shape by the edge portion 111$a$ of the substrate 111 and the edge portion 112$a$ of the substrate 112. The edge portions 111$a$ and 112$a$ of the respective substrates 111 and 112 protrude further out than the sealing member 114. The thickness of the respective substrates 111 and 112 in the present embodiment is approximately 0.25 mm.

As shown in FIG. 3, a polarizing plate 115 is bonded to an outer surface 112$c$ of the substrate 112, and a polarizing plate 116 is bonded to an outer surface 111$c$ of the substrate 111. The shape of the polarizing plate 115 is a rectangular shape as shown in FIG. 4. The polarizing plate 115 is slightly smaller in size than the substrate 112. The polarizing plate 115 is bonded to the surface 112$c$ (plate surface on the front) such that the periphery of the polarizing plate 115 fits within the surface 112$c$ of the substrate 112. The thickness of the polarizing plate 115 of the present embodiment is approximately 0.12 mm.

The polarizing plate 115 is made by sandwiching a film-shaped polarizer between protective films made of triacetyl cellulose or the like, for example. The polarizer is made by performing uniaxial stretching on a polyvinyl alcohol film dyed with iodine, for example. In another embodiment, another film such as a phase contrast film may be stacked on the polarizing plate 115.

The polarizing plate 116 has a rectangular shape, as in the polarizing plate 115, and has the same size as the polarizing plate 115. The size of the polarizing plate 116 is slightly smaller than the substrate 111. The polarizing plate 116 is also bonded to the surface 111$c$ (plate surface on the rear) such that the periphery of the polarizing plate 116 fits within the surface 111$c$ of the substrate 111. The polarizing plate 116 and the polarizing plate 115 face each other. The polarizing plate 116 also has a basic structure similar to the polarizing plate 115.

As shown in FIG. 4, the liquid crystal panel 11 has a terminal pattern 16 that is connected to ends of wiring lines drawn to the outside of the sealing member 114, the terminal pattern 16 being formed on an inner surface of the edge portion of the TFT array substrate 111. An IC (integrated circuit) chip 17 and an FPC (flexible printed circuit) 18 are mounted so as to be electrically connected to the terminal pattern 16.

The parallax barrier panel 12 mainly includes a liquid crystal layer 123, a frame-shaped sealing member 124 surrounding the liquid crystal layer 123, and a pair of transparent substrates 121 and 122 having inner surfaces 121$b$ and 122$b$ that face each other across the liquid crystal layer 123 and the sealing member 124. The substrate (third substrate) 121 and the substrate (fourth substrate) 122 are both rectangular and the same size. The substrates 121 and 122 are set such that an edge portion 121$a$ of the substrate 121 and an edge portion 122$a$ of the substrate 122 are in the same position.

An adhesive layer 21 is disposed between the liquid crystal panel 11 and the parallax barrier panel 12. The liquid crystal panel 11 and the parallax barrier panel 12 are stacked one on top of the other, bonded to each other through the adhesive layer 21. This adhesive layer 21 is made of a photocurable adhesive having a photocurable (photosensitive) resin such as an ultraviolet curable resin as its main component, for example.

As shown in FIG. 3, the positional relation of the liquid crystal panel 11 and the parallax barrier panel 12 stacked across the adhesive layer 21 is such that the respective sealing members 114 and 124 match each other in position in the direction in which panels are stacked. In this state, the edge portions 121$a$ and 122$a$ of the respective substrates 121 and 122 of the parallax barrier panel 12 protrude further to the outside than the edge portion 112$a$ of the CF substrate of the liquid crystal panel 11. An outer surface 121$c$ at the edge portion 121$a$ of the substrate 121 faces the inner surface 111$b$ at the edge portion 111$a$ of the TFT array substrate 111. The inner surface 122$b$ at the edge portion 122$a$ of the substrate 122 also faces the inner surface 111$b$ across the substrate 121.

With the liquid crystal panel 11 and the parallax barrier panel 12 having such a positional relation, a gap S1 surrounding the periphery of the polarizing plate 115 is formed between the CF substrate 112 of the liquid crystal panel 11 and the substrate 121 of the parallax barrier panel 12. Also, a gap S2 surrounding the periphery of the CF substrate 112 is formed between the TFT array substrate 111 of the liquid crystal panel 11 and the substrate 121. The gap S2 is positioned outside of the gap S1 so as to surround it, and is connected to the gap S1. The width of the gap S2 in the direction in which panels are stacked is greater than the width of the gap S1 in the direction in which panels are stacked.

Also, as shown in FIG. 3, the adhesive layer 21 is mainly disposed between the polarizing plate 115 of the liquid crystal panel 11 and the substrate 121 of the parallax barrier panel 12. In other words, the adhesive layer 21 is formed so as to cover the plate surface of the polarizing plate 115. The thickness of the adhesive layer 21 in this portion is approximately 0.05 mm. Also, a portion of the adhesive layer 21 fills the gap S1 so as to surround the periphery of the polarizing plate 115 disposed on the outer surface 112c of the CF substrate 112. Some of the adhesive layer 21 also fills some of the gap S2 described above. However, the adhesive layer 21 does not seep to the outside of the gap S2 and reach the outer surface 122c of the substrate 122 of the parallax barrier panel 12 or the outer surface 111c of the TFT array substrate 111 of the liquid crystal panel 11.

Such an adhesive layer 21 bonds together the liquid crystal panel 11 and the parallax barrier panel 12 and has the function of putting together one panel composite body 1. Having the adhesive layer 21 surround the periphery of the polarizing plate 115 also serves the function of protecting the polarizing plate 115 so that it does not absorb water (moisture) from the outside air and swell (expand). The polarizing plate 115 is sealed by the adhesive layer 21 between the CF substrate 112 and the substrate 121.

Here, a method of manufacturing the panel composite body 1 including the adhesive layer 21 will be described. First, on the plate surface of the polarizing plate 115 included in the liquid crystal panel 11, a prescribed amount of uncured liquid photocurable (ultraviolet curable) adhesive is applied (step of application).

As a method to apply the adhesive onto the plate surface of the polarizing plate 115, a known adhesive application method is used. For example, as shown in FIG. 4, a prescribed discharge nozzle (not shown) positioned above the plate surface of the rectangular polarizing plate 115 may form a plurality of linear coat films R made of the adhesive on the plate surface by having the discharge nozzle discharge the adhesive while moving in the widthwise direction. The coat films R are formed over the entire plate surface of the polarizing plate 115. However, at the stage in which the adhesive is applied onto the plate surface of the polarizing plate 115, there may be portions (gaps) where the coat film R is not formed between adjacent linear coat films R. As will be described layer, the coat film R will eventually be spread evenly over the plate surface of the polarizing plate 115 to form an adhesive layer that covers the entire plate surface.

After forming the coat films R on the plate surface of the polarizing plate 115, the parallax barrier panel 12 is placed thereon (step of stacking). The parallax barrier panel 12 is placed on the coat films R such that the substrate 121 thereof comes directly into contact with the coat films R. In other words, the coat films R made of the adhesive are sandwiched between the plate surface of the polarizing plate 115 and the outer surface 121c of the substrate 121.

The parallax barrier panel 12 is pressed onto the plate surface of the polarizing plate 115 with a certain amount of force. Then, the coat films R made of the adhesive, pressed between the plate surface of the polarizing plate 115 and the outer surface 121c of the substrate 121, spread thinly so as to cover the plate surface of the polarizing plate 115. At this time, the coat film R formed on the plate surface in the periphery of the polarizing plate 115 spreads out from the periphery of the polarizing plate 115. The state in which a portion of the coat film R seeps outward from the periphery of the polarizing plate 115 is shown schematically with arrows in FIG. 4. Then, some of the adhesive in the coat film R enters the gap S1 shown in FIG. 3. Then, the periphery of the polarizing plate 115 is covered by the adhesive. Some of the adhesive that has entered the gap S1 may go beyond the edge portion 112a of the CF substrate 112 and enter the gap S2. The positional relation between the liquid crystal panel 11 and the parallax barrier panel 12 is appropriately adjusted before the adhesive is cured.

Then, ultraviolet light is radiated onto the adhesive, thus curing the adhesive (step of curing). As the adhesive is cured, it becomes the adhesive layer 21 shown in FIG. 3, and thus, the liquid crystal panel 11 and the parallax barrier panel 12 are bonded together. Also, the periphery of the polarizing plate 115 is sealed by the adhesive layer 21. The light such as ultraviolet light is radiated towards the adhesive from outside the respective panels 11 and 12 so as to pass therethrough, for example. With the process described above, the liquid crystal panel 11 and the parallax barrier panel 12 are bonded together, thus forming the panel composite body 1.

However, if the total amount of liquid adhesive applied on the plate surface of the polarizing plate 115 is small, then the adhesive does not reach the edge portion of the plate surface, and the adhesion between the liquid crystal panel 11 and the parallax barrier panel 12 is insufficient. Also, even if the adhesion between the liquid crystal panel 11 and the parallax barrier panel 12 were sufficient, depending on the total amount of adhesive applied, sometimes the periphery of the polarizing plate 115 is exposed. Thus, depending on the total amount of adhesive applied, the amount of adhesive seeping out from between the polarizing plate 115 and the substrate 121 is insufficient.

Thus, in order to reliably cover the periphery of the polarizing plate 115 with the adhesive, in general, the total amount of adhesive applied to the plate surface of the polarizing plate 115 is set to be relatively large but within a range in which the adhesive does not seep out from the edge portion of the panel composite body 1.

In the present embodiment, a gap S1 where the adhesive for covering the periphery of the polarizing plate 115 is held is formed between the CF substrate 112 of the liquid crystal panel 11 and the substrate 121 of the parallax barrier panel 12, and the gap S2 where the adhesive that seeps out from the gap S1 can be held is present outside of the gap S1. Thus, it is easy to set the total amount of resin applied in advance on the plate surface of the polarizing plate 115 to a relatively large amount. In other words, the allowable range in total amount of the adhesive applied on the plate surface of the polarizing plate 115 is wide as a result of providing the gap S2. Thus, even if the concentration, viscosity, or the like of the adhesive changes due to the usage environment of the adhesive (humidity, temperature, and the like) changing, the amount of adhesive applied can be controlled with ease.

Thus, according to the panel composite body 1 and the manufacturing method therefor of the present embodiment, a situation in which the liquid adhesive reaches the front (outer surface 122c of the substrate 122) of the parallax barrier panel 12 or the rear (outer surface 111c of the TFT array substrate 111) of the liquid crystal panel 11, bonds to those surfaces, and causes contamination there, is mitigated while allowing the liquid crystal panel 11 and the parallax barrier panel 12 to be bonded together well. In other words, according to the panel composite body and the manufacturing method therefor of the present embodiment, it is possible to mitigate such contamination while having the liquid crystal panel 11 and the parallax barrier panel 12 bonded together sufficiently, and such that the adhesive is applied to the periphery of the polarizing plate 115 without any gaps.

Embodiment 2

Figure 5:
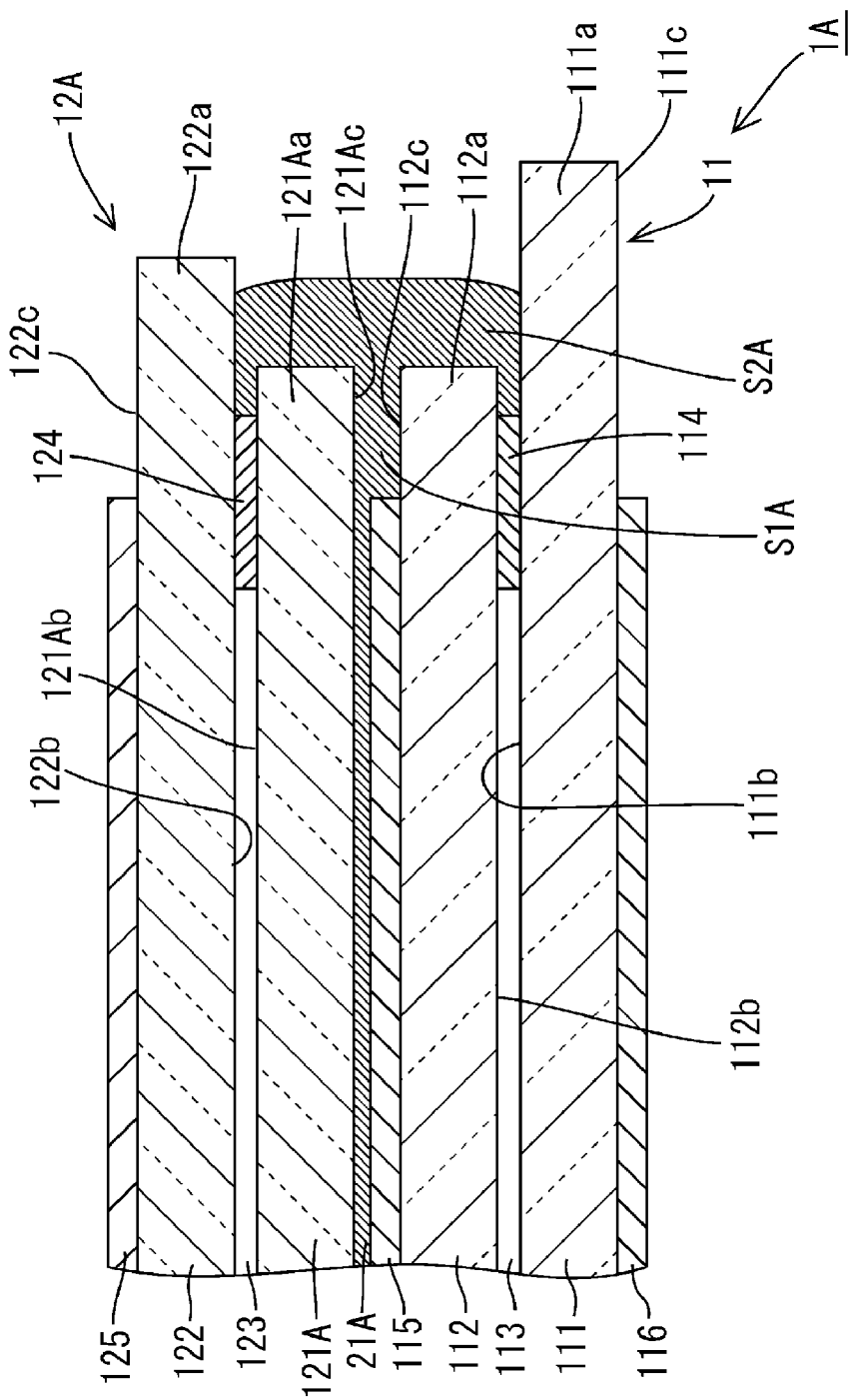
FIG. 5 is a magnified cross-sectional view of an edge portion of a panel composite body of Embodiment 2.

Next, Embodiment 2 of the present invention will be explained below with reference to FIG. 5. In the respective embodiments below, parts that are the same as those in Embodiment 1 will be assigned the same reference characters as Embodiment 1, and detailed descriptions thereof will be omitted. FIG. 5 is a magnified cross-sectional view of an edge portion of a panel composite body 1A of Embodiment 2. The basic configuration of the panel composite body 1A of the present embodiment is similar to that of Embodiment 1. Specifically, the liquid crystal panel 11 is the same as that of Embodiment 1. As for the parallax barrier panel 12A also, the basic configuration is similar to that of Embodiment 1. However, a substrate 121A included in the parallax barrier panel 12A is smaller than that of Embodiment 1, and an edge portion 121Aa thereof is disposed further inside (towards the sealing member 124) than that of Embodiment 1. In other words, the edge portion 122a of the substrate 122 of the parallax barrier panel 12A protrudes further out than the edge portion 121Aa of the substrate 121A, and an inner surface 122b at the edge portion 122a faces an inner surface 111b at an edge portion 111a of the TFT array substrate 111 included in the liquid crystal panel 11. In other words, the edge portion of the parallax barrier panel 12A is also formed into steps as in the edge portion of the liquid crystal panel 11.

The position of the edge portion 121Aa of the substrate 121A included in the parallax barrier panel 12A is set to be the same as the position of the edge portion 112a of the CF substrate 112 included in the liquid crystal panel 11.

In the panel composite body 1A of the present embodiment also, a gap S1A surrounding the periphery of a polarizing plate 115 is formed between an outer surface 112c of the substrate 112 and an outer surface 121Ac of the substrate 121A. Furthermore, a gap S2A is also formed between the inner surface 111b of the substrate 111 and the inner surface 122b of the substrate 122. In the present embodiment, the width of the gap S2A in the direction in which the panels are stacked is greater than the width of the gap S2 of the Embodiment 1, and the amount of adhesive 21A seeping out from between the substrate 112 and the substrate 121 that can be held at the gap S2A is greater than the gap S2 of Embodiment 1. In other words, in manufacturing the panel composite body 1A, when bonding together the liquid crystal panel 11 and the parallax barrier panel 12A, the allowable range of the total amount of adhesive applied on the plate surface of the polarizing plate 115 is wider than in Embodiment 1.

Thus, according to the present embodiment, a situation in which the liquid adhesive reaches the front (outer surface 122c of the substrate 122) of the parallax barrier panel 12A or the rear (outer surface 111c of the TFT array substrate 111) of the liquid crystal panel 11, bonds to those surfaces, and causes contamination there is mitigated, while allowing the liquid crystal panel 11 and the parallax barrier panel 12A to be bonded together well. In other words, according to the panel composite body 1A and the manufacturing method therefor of the present embodiment, it is possible to mitigate such contamination while having the liquid crystal panel 11 and the parallax barrier panel 12A bonded together sufficiently, and such that the adhesive is applied to the periphery of the polarizing plate 115 without any gaps.

Embodiment 3

Figure 6:
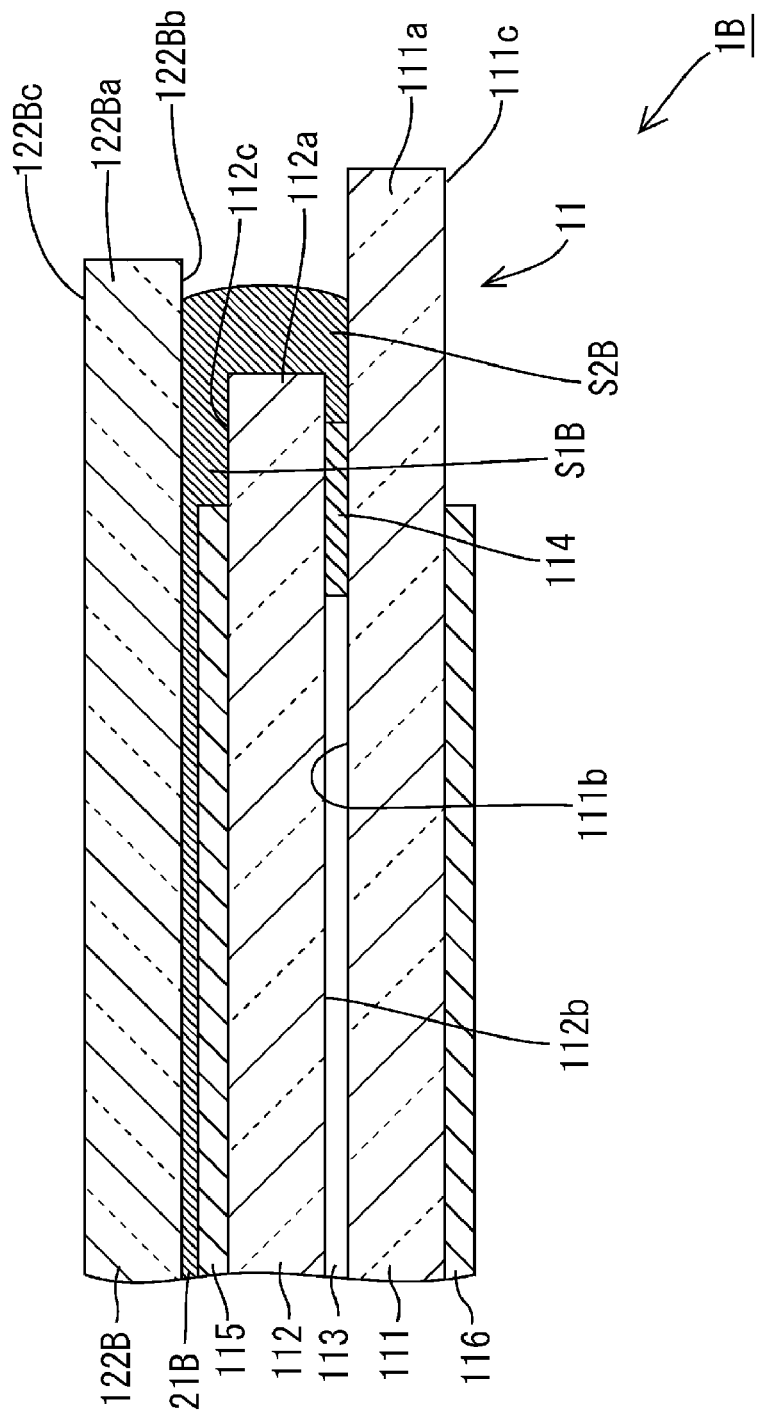
FIG. 6 is a magnified cross-sectional view of an edge portion of a panel composite body of Embodiment 3.

Next, Embodiment 3 of the present invention will be explained below with reference to FIG. 6. FIG. 6 is a magnified cross-sectional view of an edge portion of a panel composite body 1B of Embodiment 3. The liquid crystal panel 11 included in the panel composite body 1B of the present embodiment is similar to that of Embodiment 1. However, in the present embodiment, one protective plate 122B as an auxiliary panel is bonded to the liquid crystal panel 11. The protective plate 122B is for protecting the display surface of the liquid crystal panel 11, and is a transparent plate-shaped member. The protective plate 122B has a rectangular shape, and an edge portion 122Ba thereof is set so as to protrude further out than an edge portion 112a of a CF substrate 112 of the liquid crystal panel 11. An inner surface 122Bb at the edge portion 122Ba thereof faces the inner surface 111b at the edge portion 111a of the TFT array substrate 111. The inner surface 122Bb of the protective plate 122B also faces the outer surface 112c of the CF substrate 112.

In the panel composite body 1B of the present embodiment also, the outer surface 112c of the substrate 112 and the inner surface 122Bb of the protective plate 122B have a gap S1B therebetween that surrounds the periphery of the polarizing plate 115. Furthermore, a gap S2B is also formed between the inner surface 111b of the substrate 111 and the inner surface 122Bb of the protective plate 122B. The liquid crystal panel 11 and the protective plate 122B are bonded to each other through an adhesive layer 21B. In the manner, the object to be attached to the liquid crystal panel 11 may be one protective plate 122B instead of a panel made by stacking a plurality of substrates (plates) as in Embodiment 1 and the like.

In the present embodiment also, a situation in which the liquid adhesive reaches the front (outer surface 122Bc) of the protective plate 122B or the rear (outer surface 111c of the TFT array substrate 111) of the liquid crystal panel 11, bonds to those surfaces, and causes contamination there is mitigated, while allowing the liquid crystal panel 11 and the protective plate 122B to be bonded together well. In other words, according to the panel composite body 1B and the manufacturing method therefor of the present embodiment, it is possible to mitigate such contamination while having the liquid crystal panel 11 and the protective plate 122B bonded together sufficiently, and such that the adhesive is applied to the periphery of the polarizing plate 115 without any gaps.

Embodiment 4

Figure 7:
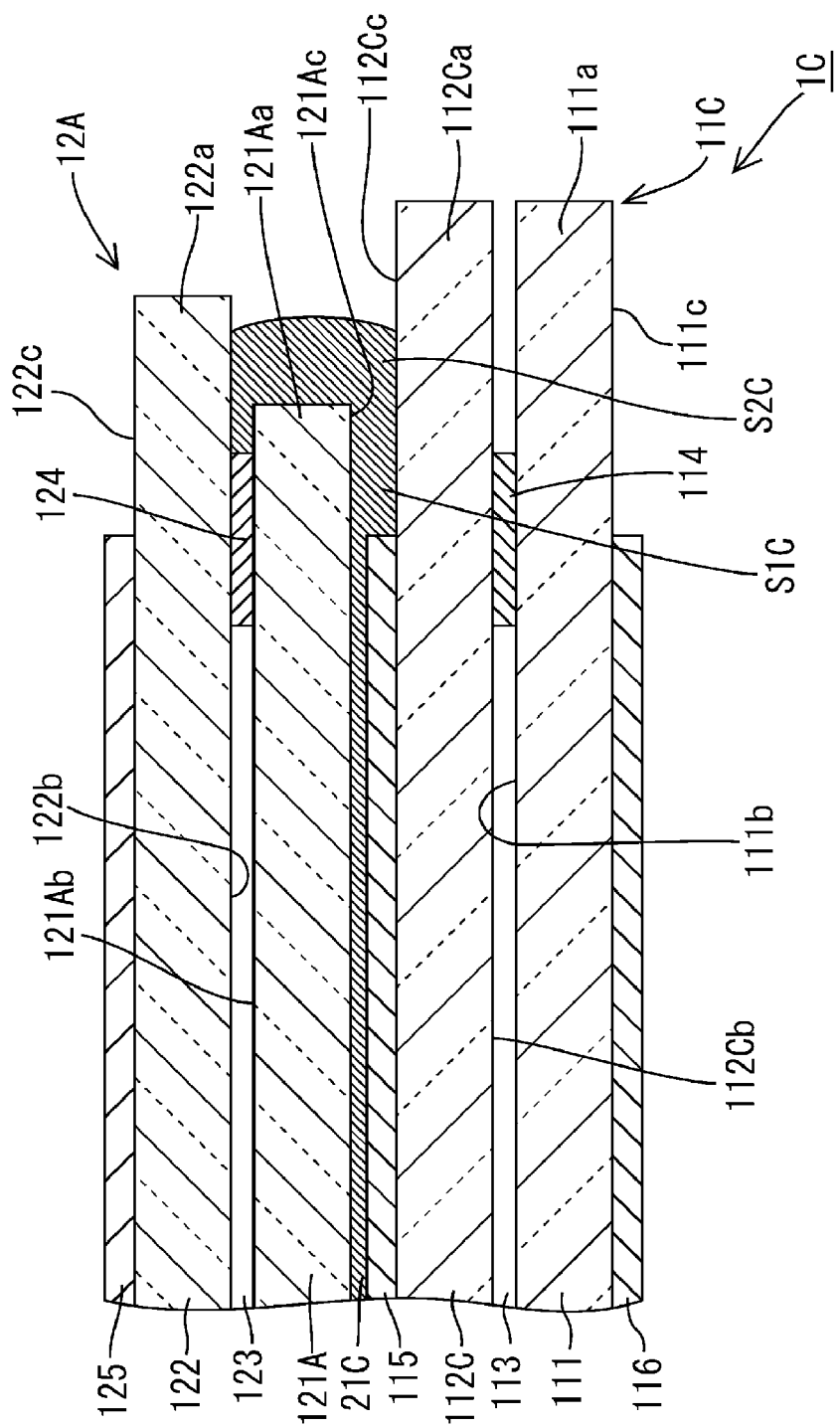
FIG. 7 is a magnified cross-sectional view of an edge portion of a panel composite body of Embodiment 4.
Figure 8:
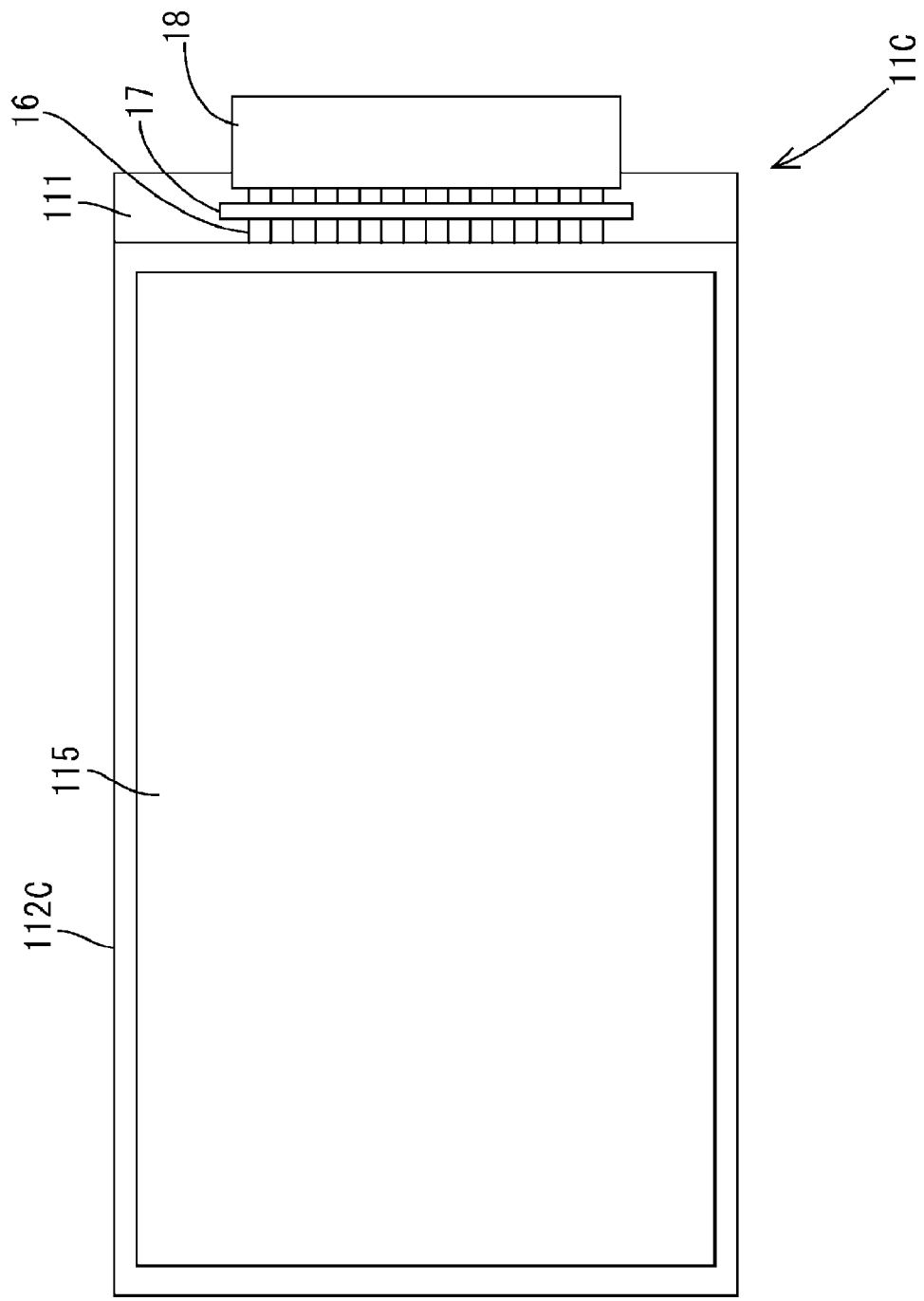
FIG. 8 is a plan view of a liquid crystal panel provided in the panel composite body of Embodiment 4.

Next, with reference to FIGS. 7 and 8, Embodiment 4 of the present invention will be explained. FIG. 7 is a magnified cross-sectional view of an edge portion of a panel composite body 1C of Embodiment 4, and FIG. 8 is a plan view of a liquid crystal panel 11C included in the panel composite body 1C of Embodiment 4. The parallax barrier panel 12A included in the panel composite body 1C of the present embodiment is similar to that of Embodiment 2. By contrast, while the basic configuration of the liquid crystal panel 11C is similar to those of Embodiment 2 and the like, the CF substrate 112C is set to be larger than those of Embodiment 2 and the like. The position of an edge portion 112Ca of the CF substrate 112C is set to be the same as an edge portion 111a of the TFT array substrate 111. As shown in FIG. 8, the length of the TFT array substrate 111 in the lengthwise direction is greater than the length of the CF substrate 112C in the lengthwise direction, and the portion where an IC chip 16 and the like are mounted is exposed from the CF substrate 112C. However, the length of the TFT array substrate 111 in the widthwise direction is set to be the same as the length of the CF substrate 112C in the widthwise direction.

In the panel composite body 1C, the inner surface 122b of the edge portion 122a of the substrate 122 is opposite to the outer surface 112Cc of the edge portion 112Ca of the CF substrate 112C. Also, the edge portion 121A*a* of the substrate 121A is disposed further inside than the edge portion 122*a* of the substrate 122, but the outer surface 121A*c* thereof faces the outer surface 112C*c* of the CF substrate 112C, in a similar manner to the substrate 122. A gap S1C is formed between the outer surface 112C*c* of the substrate 112C and the outer surface 121A*c* of the substrate 121A, and a gap S2C is formed between the outer surface 112C*c* of the substrate 112C and the inner surface 122*b* of the substrate 122. The liquid crystal panel 11C and the parallax barrier panel 12A are bonded together by the adhesive layer 21C. In the above-mentioned manner, the respective gaps S1C and S2C described above may be formed by having the edge portion of the parallax barrier panel 12A as the auxiliary panel be formed into steps instead of the liquid crystal panel 11, which is the main panel.

According to the present embodiment also, a situation in which the liquid adhesive reaches the front (outer surface 122*c*) of the parallax barrier panel 12A or the rear (outer surface 111*c* of the TFT array substrate 111) of the liquid crystal panel 11C, bonds to those surfaces, and causes contamination there is mitigated, while allowing the liquid crystal panel 11C and the parallax barrier panel 12A to be bonded together well. In other words, according to a panel composite body 1C and a manufacturing method therefor of the present embodiment, contamination is mitigated while ensuring sufficient adhesion between the liquid crystal panel 11C and the parallax barrier panel 12A. Additionally, the adhesive in the periphery of the polarizing plate 115 is spread throughout without any gaps.

Other Embodiments

The present invention is not limited to the embodiments shown in the drawings and described above, and the following embodiments are also included in the technical scope of the present invention, for example.

(1) In the embodiments above, the object bonded to the liquid crystal panel, which is the main panel, was a parallax barrier panel, which is an auxiliary panel, or a protective plate, but in other embodiments, other objects may be attached. For example, various types of panels such as a viewing angle control panel, a touch panel, and other types of panels for image display can be used as an auxiliary panel, and there is no special limitation.

(2) In the embodiments above, the auxiliary panel (parallax barrier panel) had a configuration in which one polarizing plate was bonded to one outer surface (display surface side) thereof, but in other embodiments, a configuration may be used in which a pair of polarizing plates is bonded to the respective outer surfaces of the auxiliary panel.

(3) In the embodiments above, the photocurable adhesive is cured by ultraviolet light, but in other embodiments, the adhesive may be cured by other types of light such as visible or infrared.

(4) In the embodiments above, a photocurable resin was the main component of the adhesive, but in other embodiments, a heat curable resin may be the main component, for example.

(5) In the embodiments above, the panel composite body had a configuration in which one auxiliary panel was stacked onto one main panel through an adhesive layer, but in other embodiments, a configuration may be used in which two or more auxiliary panels are stacked on one main panel through respective adhesive layers, for example. Also, a configuration may be used in which one auxiliary panel is stacked on one main panel through an adhesive layer, and on top of the auxiliary panel, a plate member such as a protective plate is stacked through another adhesive layer.

(6) In the embodiments above, the main panel included in the panel composite body was slightly larger than the auxiliary panel, but as long as the object of the present invention is achieved, in other embodiments, the main panel and the auxiliary panel may be set to the same size, or the auxiliary panel may be set to be larger than the main panel.

DESCRIPTION OF REFERENCE CHARACTERS

1, 1A, 1B, 1C panel composite body
10 liquid crystal display device (display device)
11, 11A, 11C liquid crystal panel (main panel)
12, 12A parallax barrier panel (auxiliary panel)
21, 21A, 21B, 21C adhesive layer
111 TFT array substrate (first substrate)
112 CF substrate (second substrate)
113 liquid crystal layer
115 polarizing plate
121 substrate (third substrate, opposite plate member)
122 substrate (fourth substrate, plate member)
123 liquid crystal layer
S1, S1A, S1B, S1C gap
S2, S2A, S2B, S2C gap

The invention claimed is:
1. A panel composite body, comprising:
a main panel having: a first substrate and a second substrate that is smaller than the first substrate, the first substrate and the second substrate forming a pair of substrates bonded together such that respective inner surfaces thereof face each other, an edge portion of the first substrate protruding further out than an edge portion of the second substrate; and a polarizing plate disposed on an outer surface of the second substrate so as to fit within the outer surface of the second substrate in a plan view, the polarizing plate leaving a portion of the outer surface of the second substrate exposed from the polarizing plate at a periphery of the second substrate;
an auxiliary panel sandwiching the polarizing plate with the second substrate, the auxiliary panel having a plate member protruding further out than the edge portion of the second substrate; and
an adhesive layer bonding together the main panel and the auxiliary panel, the adhesive layer being disposed in contact with and between the polarizing plate and the auxiliary panel and in contact with and between the exposed portion of the outer surface of the second substrate and the auxiliary panel so as to cover a side face of the polarizing plate,
wherein the auxiliary panel further includes an opposite plate member bonded to the plate member so as to face the plate member, the opposite plate member being disposed between the plate member and the polarizing plate,
wherein the auxiliary panel has a third substrate as the opposite plate member and a fourth substrate that is larger than the third substrate as the plate member forming a pair of substrates bonded together such that respective inner surfaces thereof face each other, in which an edge portion of the fourth substrate protrudes further out than an edge portion of the third substrate, the edge portion of the fourth substrate protruding further out than at least the edge portion of the second substrate, an inner surface at the edge portion of the fourth substrate facing an inner surface at the edge portion of the first substrate, the polarizing plate being sandwiched between the third substrate and the second substrate, wherein the adhesive layer bonds together the main panel and the auxiliary panel, the adhesive layer being disposed between the polarizing plate and the third substrate and between the exposed portion of the outer surface of the second substrate and the third substrate so as to cover side face of the polarizing plate, wherein the adhesive layer is in contact with the edge portion of the first substrate that protrudes further out than the edge portion of the second substrate panel, and wherein the adhesive layer is in contact with the edge portion of the fourth substrate that protrudes further out than an edge portion of the third substrate.

2. The panel composite body according to claim 1, wherein the adhesive layer is made of a photocurable adhesive.

3. A display device, comprising the panel composite body according to claim 1 and an illumination device that radiates light to the panel composite body.

4. A panel composite body, comprising:

a main panel having a pair of a first substrate and a second substrate bonded together such that respective inner surfaces thereof face each other, and a polarizing plate disposed on an outer surface of the second substrate so as to fit within the outer surface of the second substrate in a plan view, the polarizing plate leaving a portion of the outer surface of the second substrate exposed from the polarizing plate at a periphery of the second substrate;

an auxiliary panel having a third substrate and a fourth substrate that is larger than the third substrate, the third substrate and the fourth substrate forming a pair of substrates bonded together such that respective inner surfaces thereof face each other, in which an edge portion of the fourth substrate protrudes further out than an edge portion of the third substrate, an inner surface at the edge portion of the fourth substrate facing the outer surface at an edge portion of the second substrate, the polarizing plate being sandwiched between the third substrate and the second substrate; and an adhesive layer bonding together the main panel and the auxiliary panel, the adhesive layer being disposed in contact with and between the polarizing plate and the third substrate and in contact with and between the exposed portion of the outer surface of the second substrate and the third substrate so as to cover a side face of the polarizing plate, wherein the adhesive layer is in contact with the edge portion of the fourth substrate that protrudes further out than an edge portion of the third substrate.

5. A display device, comprising the panel composite body according to claim 4 and an illumination device that radiates light to the panel composite body.

6. The panel composite body according to claim 1, wherein in the main panel, said edge portion of the first substrate protrudes further out than said edge portion of the second substrate at every side of the second substrate.

7. The panel composite body according to claim 4, wherein the adhesive layer is made of a photocurable adhesive.

8. The panel composite body according to claim 4, wherein in the main panel, said edge portion of the first substrate protrudes further out than said edge portion of the second substrate at every side of the second substrate.

9. The panel composite body according to claim 4, wherein in the auxiliary panel, the edge portion of the fourth substrate protrudes further out than an edge portion of the third substrate at every side of the third substrate.

* * * * *